US 12,495,176 B2

(12) United States Patent
Jayasena

(10) Patent No.: US 12,495,176 B2
(45) Date of Patent: Dec. 9, 2025

(54) MEDIA CONTENT MODIFICATION USING USER PROFILES

(71) Applicant: ADVANCED MICRO DEVICES, INC., Santa Clara, CA (US)

(72) Inventor: Nuwan S. Jayasena, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 31 days.

(21) Appl. No.: 18/526,289

(22) Filed: Dec. 1, 2023

(65) Prior Publication Data

US 2025/0184554 A1 Jun. 5, 2025

(51) Int. Cl.
*H04N 21/258* (2011.01)
*G06N 20/00* (2019.01)

(52) U.S. Cl.
CPC ....... *H04N 21/25891* (2013.01); *G06N 20/00* (2019.01)

(58) Field of Classification Search
CPC .......... H04N 21/25891; G06N 20/00
See application file for complete search history.

(56) References Cited

U.S. PATENT DOCUMENTS

2010/0023964 A1\* 1/2010 Basso ............... H04N 7/10
2012/0259945 A1\* 10/2012 Gupta ............... G06F 15/16
2020/0092610 A1\* 3/2020 Baughman ......... H04N 21/4532

OTHER PUBLICATIONS

Ezenduka, Ugo. "Facebook Ad Benchmarks to Follow in 2022," AdBraze, < https://adbraze.com/blog/facebook-ad-benchmarks> 17 pages. Accessed Jul. 23, 2024.
Stelzner, Michael. "Facebook and Instagram Ad Benchmarks: What Marketers Need to Know," Social Media Examiner, <https://www.socialmediaexaminer.com/facebook-and-instagram-ad-benchmarks-what-marketers-need-to-know/>, 13 pages, Accessed Jul. 23, 2024.

\* cited by examiner

*Primary Examiner* — Anthony Bantamoi

(57) ABSTRACT

To improve user engagement with media content, a processing system is configured to modify the media content based on one or more user profiles. To this end, the processing system includes one or more servers first configured to select media content from a database to present to a user. The servers are then configured to determine one or more likeness scores between the selected media content and a user profile associated with the user. Based on the comparison of the likeness scores to the user profile, the servers then modify the media content so as to increase one or more of the determined likeness scores. The servers then provide the modified media content to the user.

20 Claims, 6 Drawing Sheets

MEDIA CONTENT MODIFICATION USING USER PROFILES

BACKGROUND

Some processing systems include servers configured to provide targeted media to one or more users when the users visit certain websites, streaming services, and the like. To this end, the servers are configured to first collect data associated with a user by scraping data associated with the user from one or more websites. Using the collected data associated with the user, the servers then select media to output to the user such as an image, video, or sound. However, selecting media to output to a user in this way requires the servers to select from already generated media, resulting in multiple users receiving the same media. Outputting the same media to multiple users increases the likelihood that the media does not attract the attention of the users and decreases the likelihood that a user will interact with the selected media.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
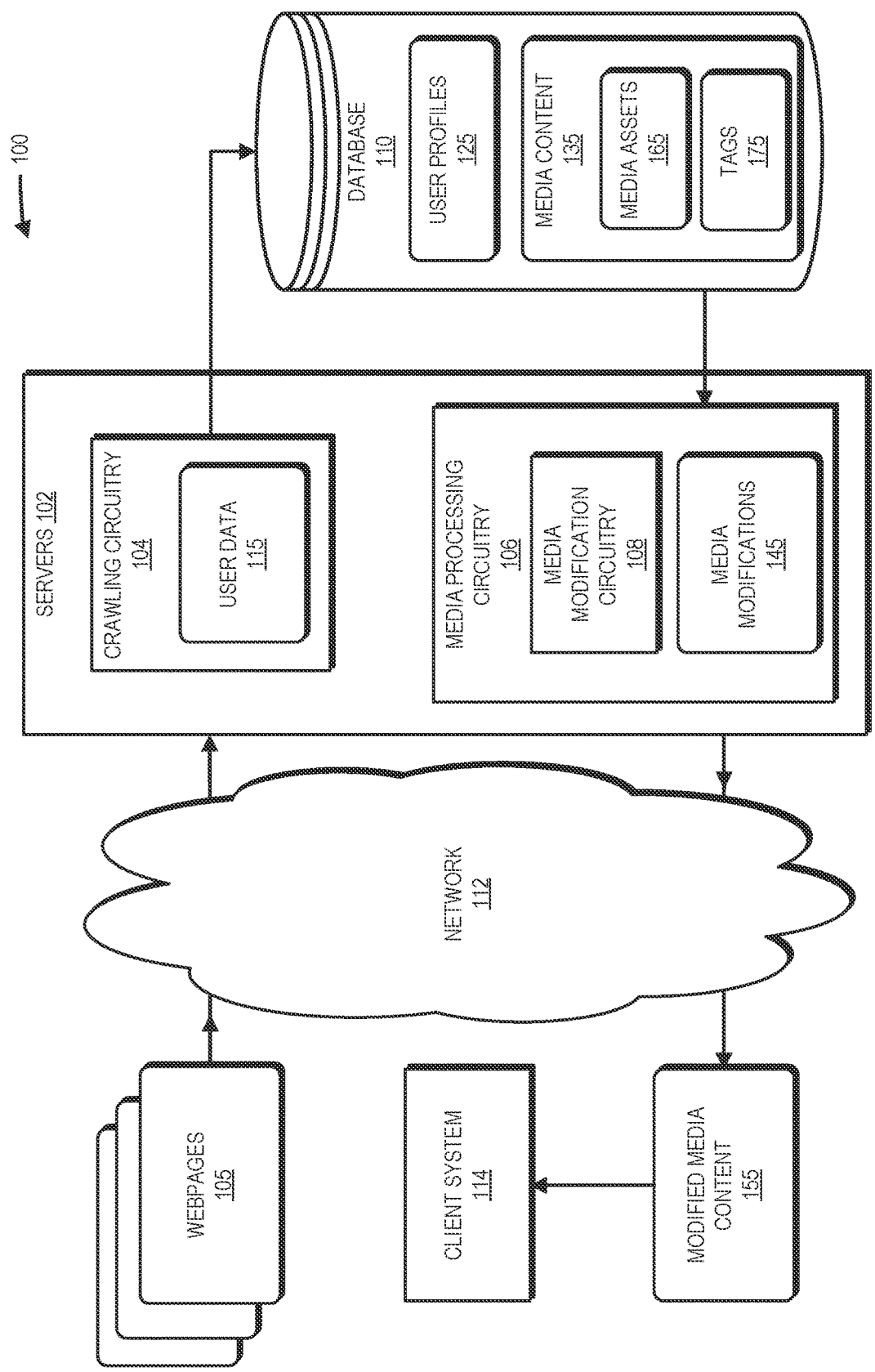
FIG. 1 is a block diagram of a processing system configured for media content modification using user profiles, in accordance with some embodiments.

To select media content to provide to a user, some processing systems include one or more servers each configured to determine user data associated with one or more users based on one or more webpages. For example, one or more servers include crawling circuitry configured to perform one or more web scraping techniques so as to extract user data associated with one or more users from one or more webpages. Further, the crawling circuitry is configured to generate a data structure representing the scraped user data and to provide the data structure to a database. In response to receiving the data structure representing the scraped user data, the database stores the user data indicated in the data structure in one or more user profiles each associated with a respective user. Each user profile, for example, includes user data indicating locations associated with the user, acquaintances associated with the user, personal data associated with the user, and the like. Based on a user profile associated with a user and stored in the database, one or more servers are configured to select media content to provide to the user. Such media content, for example, includes video, audio, and image-based media to present to a user. As an example, one or more servers of the processing system include a media processing circuitry configured to first retrieve a user profile associated with a user from the database. Using the locations, acquaintances, personal data, or any combination associated with the user indicated in the user profile, the media processing circuitry selects media content to display to the user from media content saved in the database, servers, or both. As an example, the media processing circuitry compares one or more tags of the media content saved on a database to the locations, acquaintances, personal data, or any combination associated with the user indicated in the user profile. In response to one of the tags of the media content matching one or more locations, acquaintances, personal data, or any combination associated with the user, the media processing circuitry selects the media content associated with the matched tag for display. The media processing circuitry then provides the selected media content to a client system associated with the user such that the selected media content is output to the user.

However, some selected media content presented to a user is unlikely to attract the attention of the user. For example, some users are unlikely to interact with the selected media content presented to them. To help improve engagement with the selected media content presented to the user, systems and techniques disclosed herein are directed to modifying selected media content based on a user profile. To this end, one or more servers of the processing system include a media processing circuitry first configured to select media content to display to the user. For example, the media processing circuitry is configured to select media content to display to the user based on a user profile associated with the user. Further, one or more servers of the processing system include a media modification circuitry configured to modify the selected media content based on the user profile associated with the user. As an example, the media processing circuitry is configured to first determine one or more likeness scores representing a similarity between the selected media content and one or more locations, acquaintances, personal data, or any combination indicated in the user profile associated with the user. For example, the media processing circuitry determines a location likeness score representing the similarity between the selected media content and one or more locations indicated in the user profile, an acquaintance likeness score representing the similarity between the selected media content and one or more acquaintances indicated in the user profile, a user likeness score representing the similarity between the selected media content and the personal user data indicated in the user profile, or any combination thereof. Based on one or more of the determined likeness scores, the media modification circuitry determines one or more media assets to add to the selected media content, one or more media assets to remove from the selected media content, one or more modifications to the media assets indicated in the selected media content, or any combination thereof so as to increase the one or more likeness scores representing similarities between the selected media content and data indicated in the user profile. Such media assets in the selected media content, for example, include objects, people, scenes, and the like displayed within the selected media content, one or more sounds output by the selected media content, or both.

After determining one or more media assets of the selected media content to add, remove, modify, or any combination thereof, the media modification circuitry adds, removes, modifies, or any combination thereon one or more media assets so as to have one or more likeliness scores associated with the selected media content and user profile approach a predetermined threshold value. That is to say, the media modification circuitry adds, removes, modifies, or any combination thereof, one or more media assets of the selected media content such that one or more likelihood scores representing a similarity between the selected media content and data in the user profile are equal to or greater than a predetermined threshold value. Once the media modification circuitry has added, removed, modified, or any combination thereof one or more media assets of the selected media content, the modified media content is provided to the client system for output to the user, saved to the database, or both. In this way, the processing system modifies the selected media content so that the selected media content is similar to one or more pieces of data in the user profile. By modifying the selected media content to be similar to one or more pieces of data in the user profile, the likelihood that the modified media content attracts the attention of a user is increased. As such, the likelihood that the user interacts with the modified media content is also increased, improving user engagement.

As used herein, the term "circuitry" includes hardwired circuitry, programmable circuitry, or a combination thereof. For example, circuitry may include circuitry of an application-specific integrated circuit (ASIC) that is hardwired or hardcoded to perform corresponding functions, one or more processors that execute software stored in one or more memories or other storage media to perform corresponding functions, programmable logic that has been programmed to perform corresponding functions, or some combination thereof.

FIG. 1 presents a processing system 100 configured for media content modification using user profiles, in accordance with embodiments. In embodiments, processing system 100 is configured to select and modify media content 135 to output to a user based on a user profile 125 associated with the user. Media content 135, for example, includes video frames, images, graphics objects, sounds, music, or any combination thereof. For example, in some embodiments, media content 135 includes video frames, images, graphics objects, sounds, or any combination thereof representative of an advertisement. As another example, media content 135 includes video frames, images, graphics objects, sounds, or any combination thereof representative of a public service announcement. Additionally, media content 135 includes one or more media assets 165 representing the content within one or more video frames, images, graphics objects, sounds, or any combination thereof of media content 135. As an example, media assets 165 includes data representing the locations, people, objects, products, or any combination thereof within one or more video frames, images, graphics objects, sounds, or any combination thereof of media content 135. In embodiments, to select and modify media content 135 to output to a user, processing system 100 includes one or more servers 102 each connected to a network 112 and each including one or more cloud-based servers, physical servers, or both. Network 112, for example, includes a local area network, wide area network, or any combination thereof configured to communicatively couple servers 102 to webpages 105, a client system 114 associated with the user, or both. According to embodiments, the servers 102 are configured to determine user data 115 associated with a user based on one or more webpages 105. These webpages 105, for example, include data (e.g., hypertext documents) stored on a web server and displayable on a web browser. As an example, webpages 105 include, for example, social media webpages, shopping webpages, corporate webpages, educational webpages, or any combination thereof, to name a few. In embodiments, one or more webpages 105 include user data 115 associated with a user. For example, one or more webpages 105 include data indicating one or more locations (e.g., previous locations, current locations, future locations) of the user, one or more acquaintances of the user (e.g., acquaintances' names, acquaintances' appearances, acquaintances' relationships to the user), personal data of the user (e.g., occupation, purchases, interests), or any combination thereof.

According to embodiments, one or more servers 102 are configured to extract user data 115 from one or more webpages 105 using one or more web scraping techniques. To this end, one or more servers 102 include crawling circuitry 104 configured to scrape user data 115 associated with one or more users from one or more webpages 105. As an example, crawling circuitry 104 is configured to implement one or more web scraping techniques so as to extract predetermined categories of user data 115 associated with one or more users from one or more webpages 105. These categories, for example, include locations related to a user (e.g., previous locations of a user, current locations of a user, future locations of a user), acquaintances of the user (e.g., acquaintances' names associated with the user, acquaintances' appearances, acquaintances' relationships to the user), and user personal data (e.g., occupation of the user, purchases made by the user, interests of the user). As an example, based on a webpage 105 indicating a previous vacation of the user, crawling circuitry 104 extracts user data 115 representing a previous location of the user. As another example, based on a webpage 105 indicating a picture of the user with one or more relatives, crawling circuitry 104 extracts user data 115 representing the names of acquaintances associated with the user, the appearances of acquaintances associated with the user, the relationships of the acquaintances to the user, or any combination thereof. After scraping user data 115 from one or more webpages 105, crawling circuitry 104 generates a data structure representing the extracted user data 115. Crawling circuitry 104 then provides the data structure representing the extracted user data 115 to a database 110. As an example, crawling circuitry 104 transmits the data structure representing the extracted user data 115 to a database 110 via network 112.

Database 110, for example, includes one or more storages (e.g., hard-disk drives, flash drives, flash memory, solid-state drives) configured to store the extracted user data 115 indicated in a received data structure within one or more user profiles 125. Each user profile 125, for example, includes one or more categories of data each associated with a user. As an example, a user profile 125 associated with a user includes locations related to a user (e.g., previous locations of a user, current locations of a user, future locations of a user), acquaintances of the user (e.g., acquaintances' names associated with the user, acquaintances' appearances, acquaintances' relationships to the user), user personal data (e.g., occupation of the user, purchases made by the user, interests of the user), or any combination thereof. In some embodiments, database 110 also stores media content 135 while in other embodiments media content 135 is stored on a storage (not shown for clarity) included in or otherwise connected to servers 102.

According to embodiments, servers 102 are configured to select a portion of media content 135 to output to a user based on at least a portion of the user profile 125 associated with the user. To this end, in embodiments, media content 135 includes one or more tags 175 each associated with a respective video frame, image, graphics object, sound, or any combination thereof. As an example, each tag 175 represents one or more media assets 165 (locations, people, objects, occupations, products) within a respective video frame, image, graphics object, sound, or any combination thereof of media content 135. Further, one or more servers 102 include media processing circuitry 106 configured to compare one or more tags 175 to the data indicated by the user profile 125 associated with the user. That is to say, to select media content 135 to output to a user, media processing circuitry 106 compares one or more tags 175 of media content 135 to data indicated by the user profile 125 associated with the user. As an example, media processing circuitry 106 compares the media assets 165 associated with a respective video frame, image, graphics object, sound, or any combination thereof as indicated by one or more tags 175 to the data in the user profile 125. Based on data in the user profile matching one or more media assets 165 indicated by one or more tags 175, media processing circuitry 106 selects the respective video frame, image, graphics object, or sound associated with the matched tags 175 for output. The servers 102 then provide, via network 112, the selected media content to a client system 114 associated with the user. The client system 114, for example, includes a processing system including one or more displays, speakers, or other output devices configured to output the selected media. In response to receiving the selected media content, the client system 114 outputs the selected media content to the user.

To help improve engagement with the selected media content output to the user by the client system 114, one or more servers include media modification circuitry 108 configured to modify the selected media content before it is provided to the client system 114. For example, media modification circuitry 108 is configured to modify the selected media content based on the user profile 125 associated with the user and provide the modified media content 155 to the client system 114. To this end, in embodiments, media processing circuitry 108 is configured to determine one or more likeness scores based on the selected media content and the user profile 125. For example, media processing circuitry 108 is configured to implement one or more trained regression models (e.g., linear regression models, nonlinear regression models, gaussian process regression models), neural networks (e.g., shallow neural networks, deep neural networks), k-nearest neighbor models, support vector machines, Naive Bayes models, discriminate analysis, or the like configured to determine one or more likeness scores using the selected media content and the user profile 125 as inputs. These likeness scores, for example, each include one or more values representing a similarity between the content of the selected media content and the data indicated in the user profile 125. As an example, media modification circuitry 108 is configured to determine a location likeness score representing the similarity between one or more media assets 165 of the selected media content and one or more locations (e.g., previous locations, current location, future locations) associated with the user as indicated by the user profile 125. As another example, media modification circuitry 108 is configured to determine an acquaintance likeness score representing the similarity between one or more media assets 165 of the selected media content and one or more acquaintances (e.g., acquaintances' names, acquaintances' appearances) associated with the user as indicated by the user profile 125. As yet another example, media modification circuitry 108 is configured to determine a user likeness score representing the similarity between one or more media assets 165 of the selected media content and personal data (e.g., occupation, purchases, interests) associated with the user as indicated by the user profile 125.

In embodiments, media modification circuitry 108 is configured to apply different predetermined weights to the data indicated in the user profile 125 when determining one or more likeness scores. As an example, media modification circuitry 108 applies a first weight to future locations indicated in the user profile 125 and a second weight, different from the first weight, to previous locations indicated in the user profile 125 to determine a location likeness score between the user profile 125 and the selected media content. As another example, media modification circuitry 108 applies a first weight to acquaintance appearances associated with acquaintances having a first relationship with the user and a second weight, different from the first weight, to acquaintance appearances associated with acquaintances having a second relationship with the user different from the first relationship. Additionally, in some embodiments, media modification circuitry 108 is configured to determine a total likeness score between a user profile 125 and the selected media content based on one or more determined location likeness scores, acquaintance likeness scores, user likeness scores, or any combination thereof. As an example, media modification circuitry 108 is configured to apply one or more predetermined weights to one or more location likeness scores, acquaintance likeness scores, user likeness scores, or any combination thereof to determine a total likeness score. As another example, media modification circuitry 108 is configured to determine the average of one or more one or more location likeness scores, acquaintance likeness scores, user likeness scores, or any combination thereof to determine a total likeness score.

According to embodiments, after determining one or more likeness scores, media modification circuitry 108 is configured to determine one or more media modifications 145 based on the determined likeness scores. Media modifications 145, for example, represent the additional, removal, or modification of the content of selected media content. For example, media modifications 145 represent the addition, removal, modification, or any combination thereof to one or more media assets 165 (e.g., locations, people, products, objects) of the selected media content. In embodiments, media modification circuitry 108 is configured to determine one or more media modifications 145 so as to increase one or more likeliness scores representing respective similarities between the selected media content and the user profile 125. That is to say, media modification circuitry 108 determines one or more media modifications 145 so as to increase the similarity between the selected media content and the user profile 125. For example, media processing circuitry 108 is configured to implement one or more trained regression models (e.g., linear regression models, nonlinear regression models, gaussian process regression models), neural networks (e.g., shallow neural networks, deep neural networks), k-nearest neighbor models, support vector machines, Naive Bayes models, discriminate analysis, or the like configured to determine one or more media modifications 145 so as to increase one or more likeliness scores using the selected media content and the user profile 125 as inputs. As an example, based on the selected media content and the user profile 125, media processing circuitry 108 determines one or more media assets 165 of the selected media content to add, remove, modify, or any combination thereof so as to increase a location likeness score, acquaintance likeness score, user likeness score, total likeness score, or any combination thereof associated with the the selected media content and the user profile 125.

Once one or more media modifications 145 are determined, media modification circuitry 108 modifies the media assets of the selected media content based on the determined media modifications 145 so as to produce modified media content 155. For example, based on one or more determined media modifications 145, media modification circuitry 108 adds, remove, modifies, or any combination thereof one or more media assets 165 within the selected media content to produce modified media content 155. Media modification circuitry 108 then provides, via network 112, modified media content 155 to the client system 114 associated with the user. Further, according to some embodiments, media modification circuitry 108 stores modified media content 155 on database 110 as media content 135 having one or more tags 175 associated with the user, an acquaintance of the user, or both. As an example, media modification circuitry 108 stores modified media content 155 on database 110 for later display to the user, one or more acquaintances of the user (e.g., acquaintances of the user indicated in the modified media content 155), or both. In embodiments, after receiving modified media content 155, the client system 114 then outputs the modified media content 155 to the user. In this way, media modification circuitry 108 modifies the selected media content so as to increase one or more likeness scores associated with the selected media content and the user profile 125. That is to say, media modification circuitry 108 modifies the selected media content so as to improve the similarity between the selected media content and the user profile 125. By modifying the selected media content to be more similar to one or more pieces of data in the user profile 125, the likelihood that modified media content 155 attracts the attention of the user is increased. As such, the likelihood that the user interacts with modified media content 155 is also increased, improving user engagement.

Figure 2:
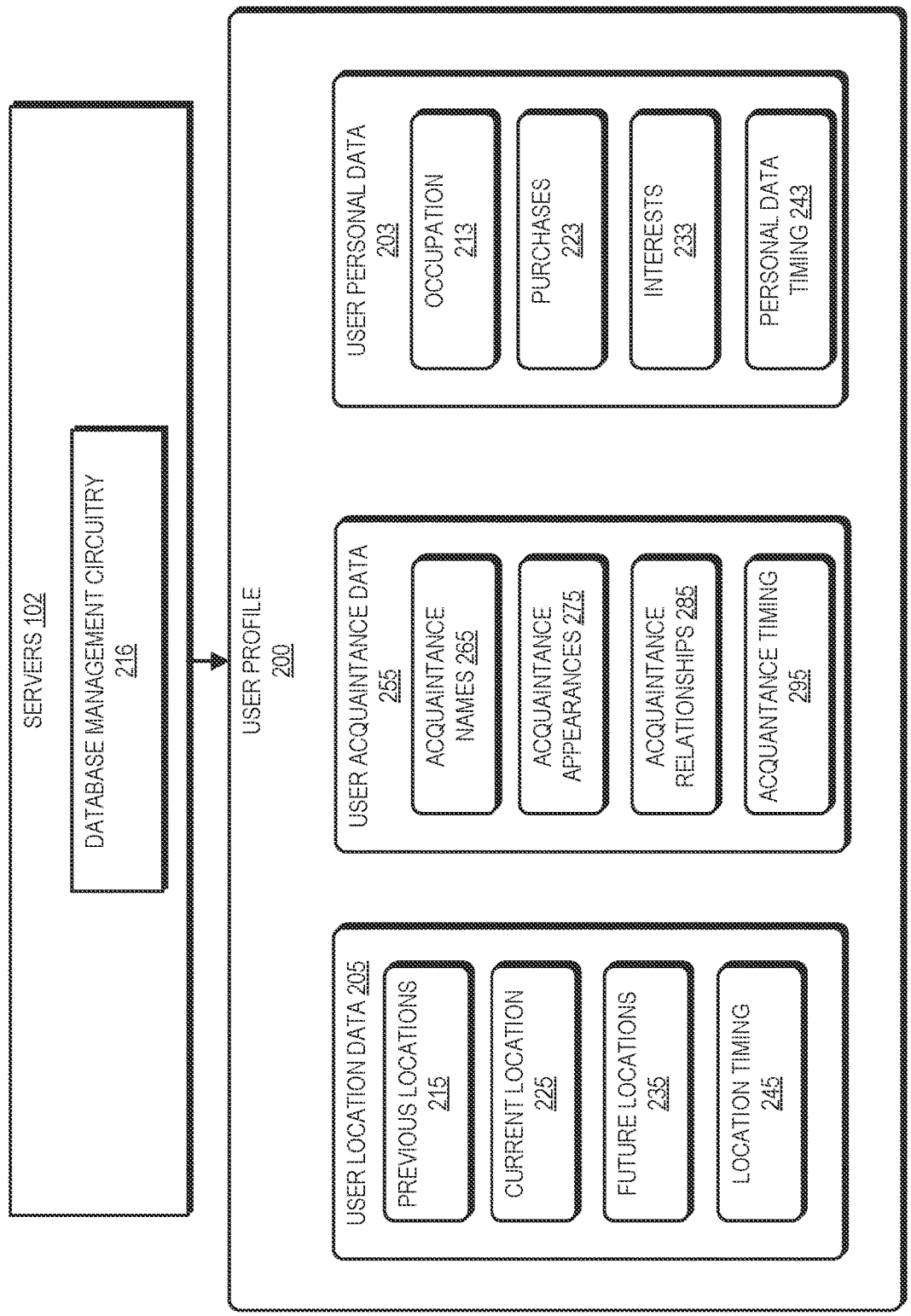
FIG. 2 is a block diagram of an example user profile, in accordance with some embodiments.

Referring now to FIG. 2, an example user profile 200 is presented. In embodiments, example user profile 200 is implemented as one of the user profiles 125 within processing system 100. In embodiments, servers 102 are configured to store a data structure representing user data 115 scraped from one or more webpages 105 in database 110 as user profile 200. According to some embodiments, user profile 200 is associated with a user and includes one or more categories of data related to the user. For example, user profile 200 includes a first category including user location data 205. The user location data 205, for example, represents one or more previous locations 215 of the user (e.g., previous worksites, previous vacations, previous establishments, previous trips), a current location 225 of the user, and one or more future locations 235 of the user (future worksites, future vacations, future establishments, future trips). Further, in some embodiments, user location data 205 includes location timing 245. Location timing 245 includes data indicating when a user was at a location (e.g., previous location 215, current location 225, future location 235), when data indicating the location was scraped, when the data indicating the location was saved in database 110, or any combination thereof. In embodiments, user profile 200 includes a second category including user acquaintance data 255. The user acquaintance data 255, for example, represents one or more acquaintance names 265 representing the names of one or more acquaintances associated with the user, acquaintance appearances 275 representing the appearances of one or more acquaintances associated with the user, acquaintance relationships 285 representing the relationships (e.g., family, coworker, friend) between one or more acquaintances and the user, or any combination thereof. According to embodiments, acquaintance appearances 275 includes data indicating the appearance of a person, for example, images, normalized data describing the appearance, graphics instructions, or any combination thereof. Additionally, user acquaintance data 255 includes acquaintance timing 295. Acquaintance timing 295 includes data indicating when a user met an acquaintance, when a user mentioned the acquaintance, when the data indicating the acquaintance was scraped, when the data indicating the acquaintance was saved in database 110, or any combination thereof.

Further, user profile 200 includes a third category including user personal data 203. The user personal data 203, for example, represents the occupation 213 of the user, one or more purchases 223 made by the user, one or more interests (e.g., hobbies, skills, sports, social activities) of the user, or any combination thereof. Additionally, user personal data 203 includes personal data timing 243. Personal data timing 243 includes when a user mentioned an occupation 213, purchase 223, or interest 233, when the data indicating an occupation 213, purchase 223, or interest 233 was scraped, when the data indicating an occupation 213, purchase 223, or interest 233 was saved in database 110, or any combination thereof. According to some embodiments, one or more servers 102 are configured to manage the data stored in user profile 200. To this end, one or more servers 102 include database management circuitry 216. In embodiments, database management circuitry 216 is configured to remove one or more portions of user location data 205, user acquaintance data 255, user personal data 203, or any combination thereof based on location timing 245, acquaintance timing 295, or personal data timing 243, respectively. As an example, database management circuitry 216 compares a location timing 245 indicating when a user visited a previous location 215 to a predetermined threshold value. In response to the comparison showing the previous location 215 was visited at a time earlier than the threshold value, database management circuitry 216 removes that previous location 215 from user location data 205. As another example, user location data 205 compares an acquaintance timing 295 indicating when a user last mentioned an acquaintance associated with an acquaintance name 265 and acquaintance appearance 275 to a predetermined threshold value. In response to the comparison showing the acquaintance was last mentioned at a time earlier than the threshold value, database management circuitry 216 removes the acquaintance name 265, acquaintance appearance 275, acquaintance relationship 285, or any combination thereof associated with the acquaintance from user acquaintance data 255.

Figure 3:
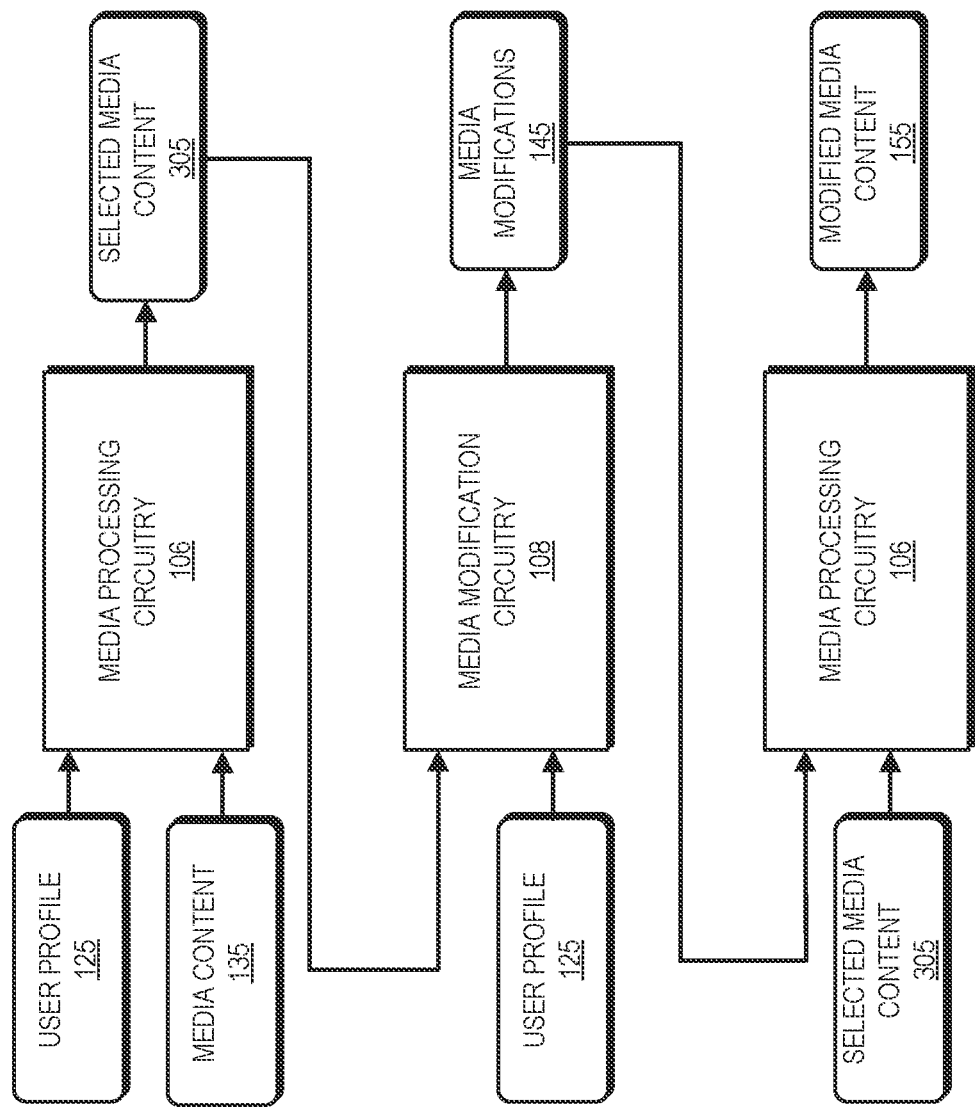
FIG. 3 is a flow diagram of an example operation for modifying selected media content based on a user profile, in accordance with some embodiments.

Referring now to FIG. 3, an example operation 300 for modifying selected media content based on a user profile is presented, in accordance with some embodiments. In embodiments, example operation 300 is implemented by one or more servers 102 of processing system 100. Further, in embodiments, example operation 300 includes media processing circuitry 106 retrieving user profile 125 and media content 135 from, for example, database 110. Based on the user profile 125 and media content 135, media processing circuitry selects at least a portion of media content 135 (represented in FIG. 3 as selected media content 305) to output to the user. As an example, media processing circuitry 106 compares one or more tags 175 of media content 135 to data indicated by the user profile 125 associated with the user. As an example, media processing circuitry 106 compares the location, people, objects, webpages 105, occupations, and products associated with a respective video frame, image, graphics object, sound, or any combination thereof as indicated by one or more tags 175 in media content 135 to the data in the user profile 125. Based on data in the user profile matching the data (e.g., people, objects, webpages 105, occupations, and products) indicated by one or more tags 175, media processing circuitry 106 selects the respective video frame, image, graphics object, or sound of media content 135 associated with the matched tags 175 to output to the user.

Example operation 300 further includes media modification circuitry 108 modifying the selected media content 305 based on the user profile 125. For example, based on the selected media content 305 and the user profile 125, media modification circuitry 108 is configured to generate one or more likeness scores each representing a similarity between the selected media content 305 and the user profile 125. As an example, media modification circuitry 108 is configured to generate a location likeness score representing the similarity between one or more locations represented by the selected media content 305 and the user location data 205 of the user profile 125, an acquaintance likeness score representing the similarity between one or more people represented by the selected media content 305 and the user acquaintance data 255, a user likeness score representing the similarity between an occupation, purchase, or interest represented by the selected media content 305 and the user personal data 203, or any combination thereof. Further, in some embodiments, to modify the selected media content 305, media modification circuitry 108 is configured to determine a total likeness score based on one or more determined location likeness scores, acquaintance likeness scores, user likeness scores, or any combination thereof. As an example, media modification circuitry 108 is configured to apply one or more weights to one or more location likeness scores, acquaintance likeness scores, user likeness scores, or any combination thereof to determine a total likeness score. According to embodiments, to determine one or more likeness scores (e.g., location likeness scores, acquaintance likeness scores, user likeness scores, total likeness scores), media modification circuitry 108 is configured to implement one or more trained regression models (e.g., linear regression models, nonlinear regression models, gaussian process regression models), neural networks (e.g., shallow neural networks, deep neural networks), k-nearest neighbor models, support vector machines, Naive Bayes models, discriminate analysis, or any combination thereof configured to receive selected media content 305 and a user profile 125 as inputs and output one or more likeness scores. As an example, media modification circuitry 108 is configured to implement one or more trained neural networks configured to receive selected media content 305 and a user profile 125 as inputs and output a location likeness score.

After determining one or more likeness scores, media modification circuitry 108 is configured to determine one or more media modifications 145 based on the selected media content 305, user profile 125, and one or more determined likeness scores. As an example, based on the selected media content 305, user profile 125, and one or more determined likeness scores, media modification circuitry 108 is configured to determine one or more media modifications 145 for selected media content 305 so as to increase one or more likeness scores representing a similarity between the selected media content 305 and the user profile 125. That is to say, media modification circuitry 108 is configured to determine one or more media modifications 145 to increase the similarity between the selected media content 305 and the user profile 125. For example, media modification circuitry 108 is configured to determine one or more media modifications 145 so as to have one or more likeness scores approach one or more predetermined thresholds. Such media modifications 145, for example, include the addition, removal, modification, or any combination thereof of one or more media assets 165 (e.g., people, locations, objects, products) represented by the selected media content 305. As such, for example, media modification circuitry 108 is configured to determine one or more media modifications 145 to add, remove, or modify one or more media assets 165 of the selected media content 305 so that the selected media content 305 more closely resembles the data in the user profile 125. To determine one or more media modifications 145, media modification circuitry 108 is configured to implement one or more trained regression models (e.g., linear regression models, nonlinear regression models, gaussian process regression models), neural networks (e.g., shallow neural networks, deep neural networks), k-nearest neighbor models, support vector machines, Naive Bayes models, discriminate analysis, or any combination thereof configured to receive selected media content 305, the user profile 125, and one or more likeness scores as inputs and output one or more media modifications 145. As an example, media modification circuitry 108 is configured to implement one or more trained neural networks configured to receive selected media content 305, the user profile 125, and an acquaintance likeness score as inputs and output a media modification 145 indicating the modification of one or more people represented by the selected media content 305 (e.g., modifications to have the people represented by the selected media content 305 more closely resemble one or more acquaintance appearances 275 of the user profile 125).

Once media modification circuitry 108 determines one or more media modifications 145, media processing circuitry 106 is configured to modify the selected media content 305. For example, based on one or more media modifications 145 and the selected media content 305, media processing circuitry 106 modifies the selected media content 305 based on the addition, removal, modification, or any combination thereof of one or more media assets 165 indicated in the media modifications 145. After modifying selected media content 305 based on one or more media modifications 145, media processing circuitry 106 produces modified media content 155. In embodiments, the servers 102 then provide modified media content 155, via network 112, to the client system 114 associated with the user of the user profile 125 used to generate the media modifications 145. Further, according to some embodiments, media modification circuitry 108 stores modified media content 155 on database 110 as media content 135 having one or more tags 175 associated with the user, an acquaintance of the user, or both. As an example, media modification circuitry 108 stores modified media content 155 on database 110 for later display to the user, one or more acquaintances of the user (e.g., acquaintances of the user indicated in the modified media content 155), or both.

Figure 4:
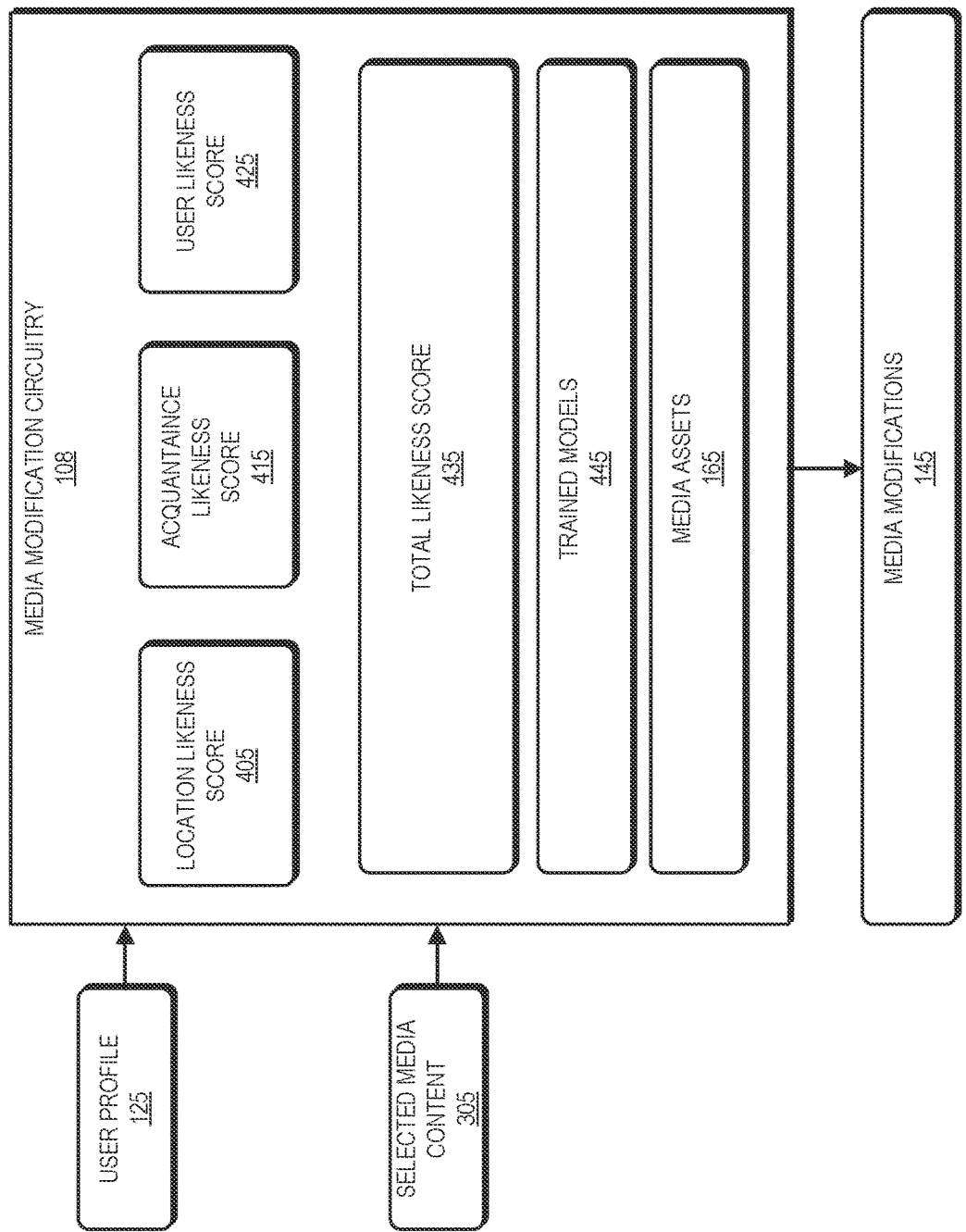
FIG. 4 is a flow diagram of an example operation for determining media modifications based on a user profile, in accordance with some embodiments.

Referring now to FIG. 4, an example operation 400 for determining one or more media modifications based on user profile is presented, in accordance with some embodiments. In embodiments, example operation 400 includes media modification circuitry 108 determining one or more likeness scores based on a user profile 125 associated with a user and selected media content 305. For example, within example operation 400, media modification circuitry 108 is configured to, based on user profile 125 associated with a user and selected media content 305, determine one or more location likeness scores 405, one or more acquaintance likeness scores 415, one or more user likeness scores 425, or any combination thereof. A location likeness score 405, for example, represents the similarity between one or more media assets 165 indicating locations represented by the selected media content 305 and the user location data 205 of the user profile 125. That is to say, the location likeness score 405 represents the similarity between one or more locations indicated by the selected media content 305 and one or more previous locations 215, current locations 225, future locations, 235, or any combination thereof indicated by the user profile 125. Further, an acquaintance likeness score 415, for example, represents the similarity between one or more media assets 165 indicating people represented by the selected media content 305 and the user acquaintance data 255 of the user profile 125. In other words, the acquaintance likeness score 415 represents the similarity between one or more people indicated by the selected media content 305 and one or more acquaintances indicated by the acquaintance names 265, acquaintance appearances 275, acquaintance relationships 285, or any combination thereof indicated by the user profile 125. Additionally, a user likeness score 425, as an example, represents the similarity between one or more media assets 165 indicating locations, people, products, or objects represented by the selected media content 305 and the user personal data 203 of the user profile 125. In other words, the user likeness score 425 represents the similarity between one or more locations, people, products, objects, or any combination thereof indicated by the selected media content 305 and one or more occupations 213, purchases 223, interests 233, or any combination thereof by the user profile 125.

In some embodiments, media modification circuitry 108 is configured to determine a total likeness score 435 based on one or more location likeness scores 405, acquaintance likeness scores 415, user likeness scores 425, or any combination thereof. As an example, media modification circuitry 108 is configured to apply one or more weights to one or more location likeness scores 405, acquaintance likeness scores 415, user likeness scores 425, or any combination thereof to determine a total likeness score 435. As another example, media modification circuitry 108 is configured to determine the average of one or more weights to one or more location likeness scores 405, acquaintance likeness scores 415, user likeness scores 425, or any combination thereof to determine a total likeness score 435. According to embodiments, to determine one or more location likeness scores 405, acquaintance likeness scores 415, user likeness scores 425, total likeness scores 435, or any combination thereof, media modification circuitry 108 is configured to implement one or more trained models 445 configured to receive selected media content 305 and a user profile 125 as inputs and output one or more location likeness scores 405, acquaintance likeness scores 415, user likeness scores 425, total likeness scores 435, or any combination thereof. These trained models 445, for example, include one or more trained regression models (e.g., linear regression models, nonlinear regression models, gaussian process regression models), neural networks (e.g., shallow neural networks, deep neural networks), k-nearest neighbor models, support vector machines, Naive Bayes models, discriminate analysis, or any combination thereof, to name a few. In embodiments, media modification circuitry 108 is configured to train one or more trained models 445 using one or more user profiles 125, media content 135, or both stored on, for example, database 110.

After determining one or more location likeness scores 405, acquaintance likeness scores 415, user likeness scores 425, total likeness scores 435, or any combination thereof, media modification circuitry 108 is configured to determine one or more media modifications 145 to one or more media assets 165 of the selected media content 305 based on the user profile 125, selected media content 305, and one or more determined likeness scores. As an example, media modification circuitry 108 is configured to determine one or more media modifications 145 that represent the addition, removal, modification, or any combination thereof of one or more media assets 165 in the selected media content 305 so as to increase one or more likeness scores (e.g., location likeness score 405, acquaintance likeness score 415, user likeness score 425, total likeness score 435). In other words, media modification circuitry 108 is configured to determine one or more media modifications 145 that represent the addition, removal, modification, or any combination thereof of one or more media assets 165 represented by the selected media content 305 so as to increase the similarity between the selected media content 305 and the user profile 125. According to embodiments, media modification circuitry 108 is configured to implement one or more trained models 445 to determine one or more media modifications 145. For example, in some embodiments, media modification circuitry 108 implements one or more trained models 445 configured to receive the user profile 125, selected media content 305, and one or more likeness scores (e.g., location likeness scores 405, acquaintance likeness scores 415, user likeness scores 425, total likeness scores 435) as inputs and output one or more media modifications 145 that increase the similarity between the selected media content 305 and at least a portion of the user profile 125. As an example, media modification circuitry 108 implements one or more trained models 445 configured to receive the user profile 125, selected media content 305, a location likeness score 405, and acquaintance likeness score 415 as inputs and output one or more media modifications 145 that increase the similarity between the selected media content 305 and the user location data 205 and user acquaintance data 255 of the user profile 125.

After media modification circuitry 108 generates one or more media modifications 145, example operation 400 includes providing the media modifications 145 to media processing circuitry 106. Media processing circuitry 106 then adds, removes, modifies, or any combination thereof one or more media assets 165 of the selected media content 305 based on the media modifications 145 to produce modified media content 155. The servers 102 then provide the modified media content 155 to the client system 114 associated with the user for output to the user, store the modified media content 155 on database 110, or both.

Figure 5:
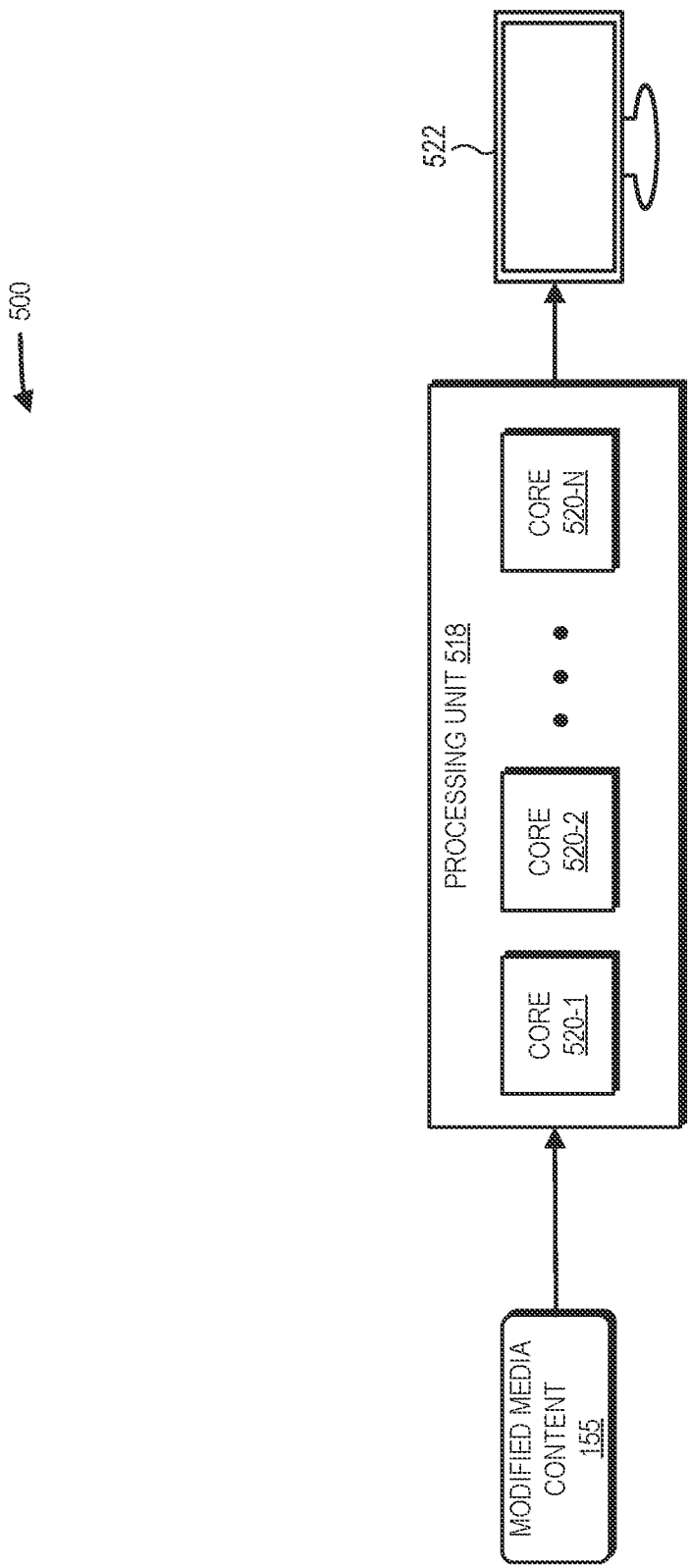
FIG. 5 is a block diagram of an example client system configured to output modified media content, in accordance with some embodiments.

Referring now to FIG. 5, an example client system 500 configured to display modified media content is presented, in accordance with embodiments. According to embodiments, example client system 500 is implemented as a client system 114 within processing system 100. In embodiments, example client system 500 is configured to receive modified media content 155 from one or more servers 102 via network 112. To output the modified media content 155, for example, example client system 500 includes processing unit 518. Processing unit 518 includes, for example, vector processors, coprocessors, graphics processing units (GPUs), general-purpose GPUs (GPGPUs), accelerated processing units (APUs), non-scalar processors, highly parallel processors, artificial intelligence (AI) processors, inference engines, machine learning processors, other multithreaded processing units, scalar processors, serial processors, or any combination thereof.

To support the output of modified media content 155 to a user, processing unit 518 is configured to decode, render, or both one or more frames, images, or both indicated in modified media content 155. As an example, processing unit 518 is configured to decode one or more frames indicated in modified media content 155 based on one or more codecs to produce one or more pixel values. As another example, processing unit 518 renders one or more graphics objects based on the modified media content 155 to produce pixel values. To help render the graphics objects, processing unit 518, for example, implements a plurality of processor cores 520-1 to 520-N that execute instructions concurrently or in parallel. For example, processing unit 518 executes instructions indicated in modified media content 155 using a plurality of processor cores 520 to render one or more graphics objects. According to implementations, one or more processor cores 520 operate as SIMD units that perform the same operation on different data sets. Though, in the example implementation illustrated in FIG. 5, three processor cores (520-1, 520-2, 520-N) are presented representing an N number of processor cores, the number of processor cores 520 implemented in processing unit 518 is a matter of design choice. As such, in other implementations, processing unit 518 can include any number of processor cores 520.

According to embodiments, example client system 500 includes a display 522 configured to output at least a portion of modified media content 155. As an example, in embodiments, processing unit 518 is configured to decode one or more frames, images, or both indicated in modified media content 155 so as to produce one or more pixel values. As another example, based on modified media content 155, processing unit 518 is configured to render one or more graphics objects so as to produce one or more pixel values. After determining one or more pixel values from modified media content 155, processing unit 518 then provides the pixel values to display 522. In response to receiving the pixel values, display 522 outputs one or more frames, images, or both represented by modified media content 155.

Figure 6:
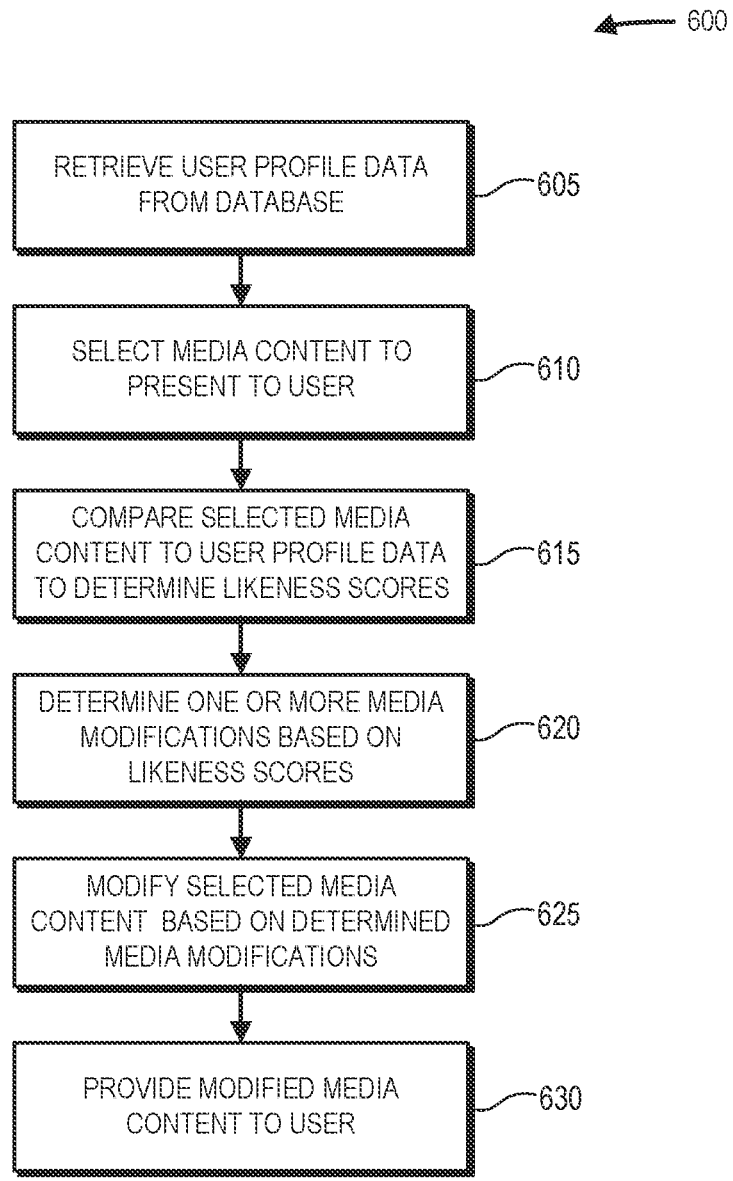
FIG. 6 is a flow diagram of an example method for modifying selected media content based on a user profile, in accordance with some embodiments.

Referring now to FIG. 6, an example method 600 for modifying selected media content based on a user profile is presented, in accordance with embodiments. In embodiments, at block 605 of example method 600, one or more servers 102 are configured to retrieve a user profile (e.g., user profiles 125, 200) associated with a user from a database 110. After retrieving the user profile, the servers 102 are configured to select media content 135 to present to the user associated with the user profile. For example, in embodiments, media content 135 includes one or more tags 175 each representing one or more media assets 165 within one or more video frames, images, graphics objects, sounds, or any combination thereof media content 135. In embodiments, one or more servers 102 are configured to compare one or more tags 175 to the data indicated by a user profile 125 associated with the user. That is to say, to select media content 135 to output to a user, one or more servers 102 compare one or more tags 175 of media content 135 to data indicated by the user profile 125 associated with the user. Based on data in the user profile 125 matching the media asset 165 indicated by one or more tags 175, media processing circuitry 106 selects the respective video frame, image, graphics object, or sound associated with the matched tags 175 for output to the user.

At block 615, one or more servers 102 are configured to determine one or more likeness scores based on the selected media content 305 (e.g., the media content 135 selected at block 610) and the user profile 125 used to select the selected media content 305. For example, based on the selected media content 305 and the user profile 125, one or more servers 102 are configured to determine one or more location likeness scores 405, acquaintance likeness scores 415, user likeness scores 425, total likeness scores 435, or any combination thereof each representing a similarity between the selected media content 305 and at least a portion of the user profile 125. That is to say, for example, the one or more determined location likeness scores 405, acquaintance likeness scores 415, user likeness scores 425, total likeness scores 435, or any combination thereof each represents a similarity between one or more media assets 165 represented by the selected media content 305 and at least a portion of the user profile 125. To determine one or more likeness scores, one or more servers 102 are configured to implement one or more trained models 445 configured to receive the selected media content 305 and user profile 125 as an input and output one or more likeness scores. After determining one or more likeness scores, at block 620, one or more servers 102 are configured to determine one or more media modifications 145 based on the selected media content 305, user profile 125, and one or more determined likeness scores. As an example, one or more servers 102 are configured to determine one or more media modifications 145 so as to have one or more of the determined likeness scores approach a predetermined threshold value. That is to say, one or more servers 102 are configured to determine one or more media modifications 145 so as to increase the similarity between one or more media assets 165 of the selected media content 305 and one or more portions of the user profile 125.

Still referring to block 620, to determine one or more media modifications 145, one or more servers 102 are configured to implement one or more trained models 445 configured to receive the selected media content 305, user profile 125, and one or more likeness scores as inputs and output one or more media modifications. For example, one or more servers 102 are configured to implement one or more trained models 445 configured to determine one or more additions, removals, modifications, or any combination thereof to the media assets 165 of the selected media content 305 so as to increase the similarity between the selected media content 305 and at least a portion of the user profile 125. As another example, one or more servers 102 are configured to implement one or more trained models 445 configured to determine one or more additions, removals, modifications, or any combination thereof to the media assets 165 of the selected media content 305 so as to have one or more determined likeness models approach one or more predetermined threshold values. Once one or more media modifications 145 are determined, at block 625, the servers 102 are configured to modify the selected media content 305 based on the media modifications 145. As an example, the servers 102 add, remove, modify, or any combination thereof one or more media assets 165 of the selected media content 305 based on one or more media modifications 145 to produce modified media content 155. At block 630, the servers 102 then provide the modified media content 155 to a client system 114 associated with the same user as the user profile 125, for example, retrieved at block 605. For example, one or more servers 102 provide the modified media content 155 via network 112 to a client system 114. In response to receiving the modified media content 155, the client system 114 outputs the modified media content 155 to the user.

In some embodiments, the apparatus and techniques described above are implemented in a system including one or more integrated circuit (IC) devices (also referred to as integrated circuit packages or microchips), such as the servers described above with reference to FIGS. 1-6. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design shown herein, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing system, including:
   one or more servers each coupled to a network, wherein the one or more servers are configured to:
   select media content based on a user profile;
   modify at least a portion of the media content based on a likeness score representing a similarity between the selected media content and at least a portion of the user profile and to produce modified media content; and
   transmit, via the network, the modified media content to a client system.

2. The processing system of claim 1, wherein the one or more servers are configured to:
   based on the likeness score, determine one or more modifications to the media content.

3. The processing system of claim 2, wherein the likeness score further represents a similarity between a location represented by the media content and the at least a portion of the user profile.

4. The processing system of claim 2, wherein the one or more servers are configured to determine the one or more modifications so the likeness score approaches a predetermined threshold.

5. The processing system of claim 1, wherein the one or more servers are configured to implement one or more trained models configured to receive the media content, the user profile, and the likeness score as inputs and output one or more media modifications to the media content.

6. The processing system of claim 1, wherein the one or more servers are configured to:
   scrape user data from one or more webpages; and
   store the user data in the user profile.

7. The processing system of claim 1, wherein the at least a portion of the user profile indicates an occupation of a user.

8. A method, comprising:
   selecting, by one or more servers, media content based on a user profile;
   modifying at least a portion of the selected media content based on a likeness score representing a similarity between the selected media content and at least a portion of the user profile to produce modified media content; and transmit, via a network, the modified media content to a client system.

9. The method of claim 8, further comprising:

based on the likeness score, determining one or more modifications to one or more media assets of the media content.

10. The method of claim 9, wherein the likeness score further represents a similarity between a person represented by the media content and the at least a portion of the user profile.

11. The method of claim 9, wherein determining one or more modifications to one or more media assets includes:

determining the one or more modifications to the one or more media assets so the likeness score approaches a predetermined threshold.

12. The method of claim 8, further comprising:

implementing one or more trained models configured to receive the media content, the user profile, and the likeness score as inputs and output one or more media modifications to the media content.

13. The method of claim 8, further comprising:

scraping, by the one or more servers, user data from one or more webpages; and storing the user data in the user profile.

14. The method of claim 8, wherein the at least a portion of the user profile indicates one or more relationships of a user.

15. A processing system, comprising:

a database configured to store one or more user profiles and media content; and one or more servers configured to:

modify at least a portion of the media content selected by a user based on a likeness score representing a similarity between the at least a portion of the media content selected by the user and at least a portion of a user profile of the one or more user profiles associated with the user to produce modified media content; and transmitting the modified media content to a client system associated with the user.

16. The processing system of claim 15, wherein the one or more servers are configured to:

based on the likeness score, determine one or more modifications to one or media assets of the at least a portion of the media content.

17. The processing system of claim 16, wherein the likeness score further represents a similarity between a location represented by the at least a portion of the media content and the at least a portion of the user profile associated with the user.

18. The processing system of claim 16, wherein the one or more servers are configured to determine the one or more modifications to the media assets so the likeness score approaches a predetermined threshold.

19. The processing system of claim 15, wherein the one or more servers are configured to implement one or more trained models configured to receive the at least a portion of the media content, the user profile associated with the user, and the likeness score as inputs and output one or more media modifications to the media content.

20. The processing system of claim 15, wherein the at least a portion of the user profile indicates one or more purchases of the user.

* * * * *